Oct. 11, 1938.  G. C. MacMURRAY  2,132,903
JACK FOR LIFTING AUTOMOTIVE VEHICLES
Filed Aug. 22, 1936
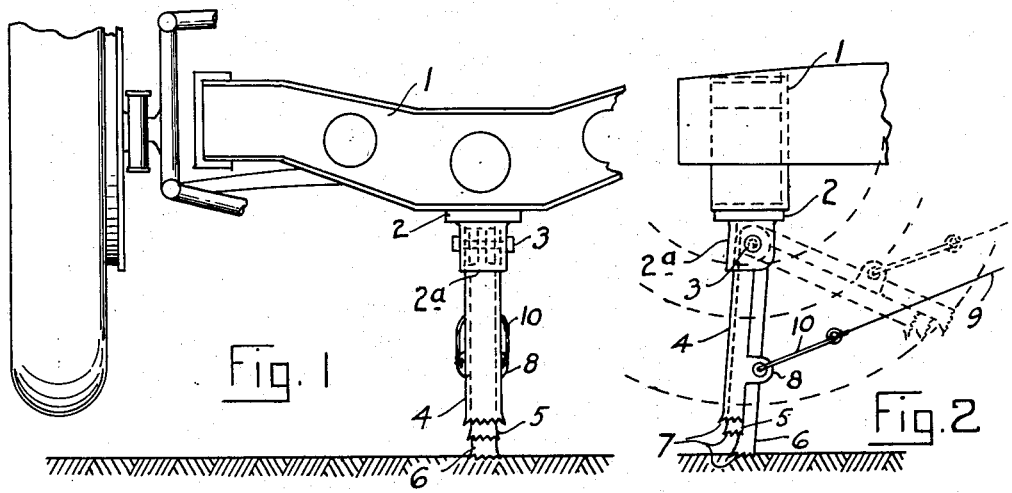
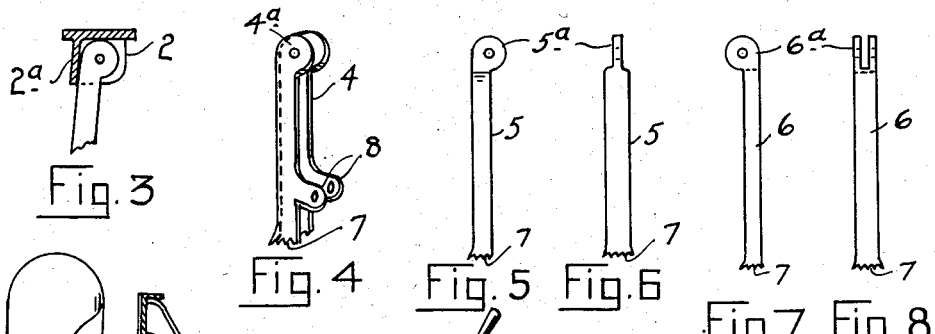
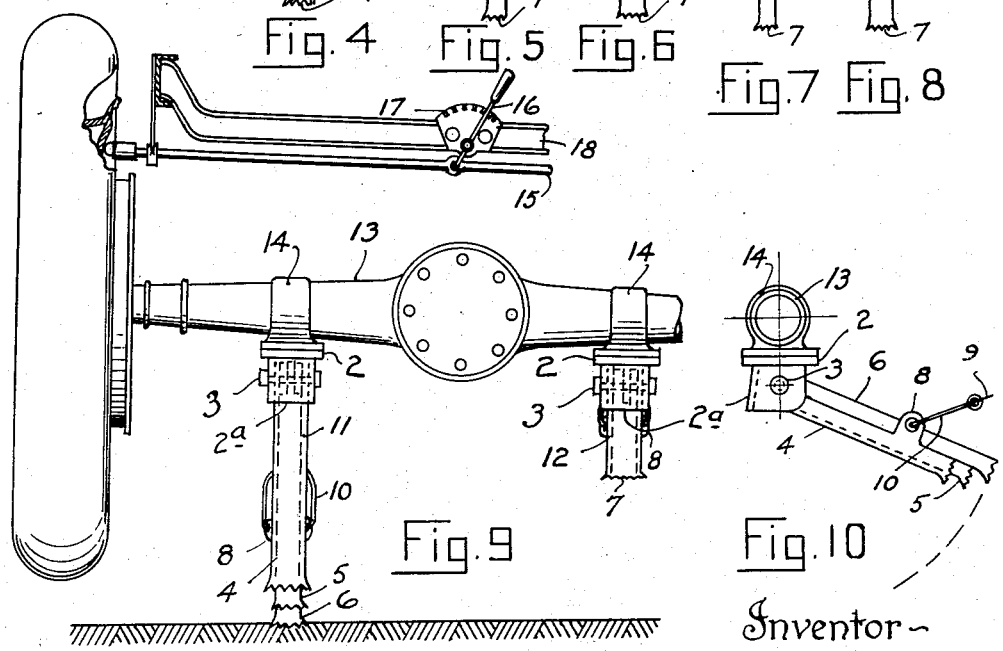
Inventor—
Gilbert Clifford MacMurray Patented Oct. 11, 1938

2,132,903

UNITED STATES PATENT OFFICE 2,132,903

JACK FOR LIFTING AUTOMOTIVE VEHICLES

Gilbert Clifford MacMurray, Calgary, Alberta, Canada

Application August 22, 1936, Serial No. 97,434

1 Claim. (Cl. 254—94)

My invention relates to improvements in jacks for lifting automotive vehicles, and the objects of my invention are to provide an attached jacking device as part of the running equipment of such a vehicle, one that can be positioned from the interior of the vehicle, and one that is dependent on the powered movement of the vehicle to raise a wheel or wheels off the ground for repairs or tire changing, the device being so designed and operable that it can also be used as a holdfast when parked, as also when starting on an upgrade to thus dispense with the necessity of applying the brakes, as is generally resorted to.

A further provision in connection with the device is an auxiliary rear wheel braking system, the object of which is to prevent rotation of the rear wheel that is to be raised in order to assure traction by the other wheel for raising the said rear wheel by means of the jacking device, such a braking action on either rear wheel being also a convenience when endeavoring to extricate the vehicle from a mired situation on the road.

I attain these objects by the device illustrated in the accompanying drawing, in which—

Fig. 1 is a view of the front end of an automotive vehicle showing the jack in place and the front of the chassis raised by the jack.

Fig. 2 shows a side view in part of Fig. 1.

Fig. 3 shows a sectional side view of typical wrist pin bearing block.

Fig. 4 illustrates in perspective the short leading lifting strut.

Fig. 5 is a side view of the lifting strut that fits into the strut in Fig. 4.

Fig. 6 is a rear view of Fig. 5.

Fig. 7 is a side view of the longest strut disposed adjacent to the strut seen in Fig. 5.

Fig. 8 is a rear view of Fig. 7.

Fig. 9 is a view showing the rear axle raised by one jack with one wheel off the ground.

Fig. 10 shows a side view of a rear jack in raised position.

Similar numerals refer to similar parts throughout the several views.

1 represents a forward lateral or cross member of the chassis of an automotive vehicle, to which a wrist-pin bearing block 2 is rigidly attached on the under side as shown, or on any preferred side. Any convenient forward, lateral or cross member could be utilized for this purpose. The object of the said bearing block 2 is to support in pivotal suspension by means of a wrist-pin 3 a plurality of lifting struts 4, 5 and 6, each said strut being pivotally mounted at its top end on the said wrist-pin 3. These lifting struts or leg members are designed so that the shortest leading member 4 is channel shaped with flanges rearwardly projecting in order to house the adjacent longer leg member 5 that projects downwardly slightly beyond the lower end of the first mentioned channel shaped member 4. In this particular construction the third leg member 6 lies immediately adjacent to and rearwardly of the said leg member 5, and projects downwardly slightly beyond the lower end of this middle leg member 5. These struts or leg members have serrated edges at their bottom ends at 7 for proper hold on the road surface.

Lugs 8, projecting rearwardly from the flanges of the leg member 4, act as guides for the other adjacent leg members when being let down and pulled up during use. A cable 9 is connected to the said lugs 8 by means of a saddle yoke 10 for lowering and raising this device, such controllable means terminating and being disposed within the vehicle. A system of push and pull rods and levers could readily be substituted for the cable control. The shapes of the leg members 4, 5 and 6 are typically shown in Figs. 4 to 8 respectively, where the upper end 4a of member 4 is flanged to receive and bear pivotally upon the wrist-pin 3, the said pin 3 bearing within the bearing block 2 as before mentioned. The upper end of member 5 is lugged at 5a and drilled to bear pivotally upon the said wrist-pin 3. Also the upper end of the member 6 is lugged, drilled, and slotted as at 6a to receive the upper end 5a of the said member 5, so as to bear pivotally upon the said wrist-pin 3. The housing side 2a of the bearing block 2 acts as a stop limiting the radial swing of the leg struts and is forwardly inclined for reasons stated later.

The operation of this device as so far described and illustrated is as follows: The leg members 4, 5 and 6 are lowered together when the vehicle is stationary, the legs resting on the ground in angular positions. As soon as the vehicle is driven in a reverse or backward direction these legs consecutively contact firmly on the ground to gradually raise the front wheels off the road until the longest leg stands firmly at a slightly forward angle with respect to the perpendicular, such angle depending on the angularity of the stop member 2a.

This description has so far referred only to the raising of the front wheels of a vehicle. Figs. 9 and 10 refer specifically to the applications of this same device for raising a rear wheel. The two jacks 11 and 12 for raising purposes are similar in construction to the forward jack, except that they are slightly longer. The operation is the same, and they are likewise controlled from the interior of the vehicle. The method of attachment to the rear axle 13 is typically shown at 14, this being a strap welded to the axle and to which the bearing block 2 is fixedly attached. The raising of a rear wheel by means of one of these rear jacks, as illustrated, is performed by driving the vehicle slowly forward after the leg members have been lowered to the ground. The raised axle will directly lift one wheel off the ground as desired, and by backing the vehicle the reverse action is effected, and the wheel will rest on the road. The disposition of these rear jacks as shown, is the reverse of the forward jack.

To enable one wheel to maintain power connection with the driving elements of the vehicle when the other rear wheel is raised, it is essential that the wheel to be raised must be arrested from rotating. Very slight pressure only is required to effect this. A laterally disposed brake rod 15 is slidably suspended from the chassis frame, being controlled for lateral movement by a hand lever 16 pivotally mounted on a ratchet plate 17, the said plate being attached to a cross member 18 of the chassis. The lever 16 is manually operable from the inside of the rear deck compartment, and is sprung to engage the ratchet teeth of the plate 17. By lateral pressure the lever operates the brake rod 15, the ends of which contact the rim of one or other of the wheels to hold it fast. This principle and braking system will also serve to be of value when traction is required with one wheel only for extricating the vehicle from a mud-hole or slippery roads. Owing to extreme simplicity of my device the same can be manufactured at low cost, and will be strong, durable and efficient in operation.

Having shown the preferred embodiment of my invention, it is to be understood that various alterations in the size, shape, and arrangement and number of parts may be resorted to without departing from the spirit of the invention and the scope of the appended claims.

It is also to be understood that whereas a plurality of struts or leg members is specified and claimed, a single strut or leg member may be employed in each jack, to be manipulated in the same manner as the said multi-leg combination.

It is also further to be understood that whereas the jacks are shown as lifted in certain directions they may be so designed to be raised in the opposite directions, and to operate as jacks in such opposite directions.

What I claim as my invention and desire to secure by Letters Patent, is—

In an automotive vehicle lifting jack, a bearing bracket having a socket open at one side, a wrist pin within the socket of said bracket, a channel shaped elongated strut pivotally suspended at one end from said wrist pin having parallel ears projecting from its longitudinal edges intermediate the length thereof, a saddle yoke pivotally connected to the ears of said channel strut, a second solid strut of greater length then the channel strut pivotally suspended at one end from said wrist pin and adapted to nest within the channel strut, a third solid strut of greater length then said second strut pivotally suspended at one end from said wrist pin in parallel relation to said second strut and confined between the ears of the channel strut, a cable connected to said yoke for raising and lowering said struts, and a stop formed by the wall of said socket for limiting the pivotal movement of said struts when lowered to an operative position.

GILBERT CLIFFORD MacMURRAY.